(12) United States Patent
Jang et al.

(10) Patent No.: US 8,763,764 B2
(45) Date of Patent: Jul. 1, 2014

(54) LOCKING APPARATUS FOR PARKING BRAKE

(75) Inventors: Sung Wook Jang, Hwasung-si (KR); Gyu Chull Doh, Yongin-si (KR); Chang-Hoon Lee, Busan (KR)

(73) Assignees: Hyundai Motor Company, Seoul (KR); Unick Corporation, Busan (KR)

( * ) Notice: Subject to any disclaimer, the term of this patent is extended or adjusted under 35 U.S.C. 154(b) by 220 days.

(21) Appl. No.: 13/315,986

(22) Filed: Dec. 9, 2011

(65) Prior Publication Data

US 2013/0020156 A1 Jan. 24, 2013

(30) Foreign Application Priority Data

Jul. 21, 2011 (KR) .......................... 10-2011-0072554

(51) Int. Cl.
*B60T 1/00* (2006.01)
(52) U.S. Cl.
USPC ................ 188/31; 188/300; 92/30; 303/89
(58) Field of Classification Search
USPC ............... 188/31, 17, 67, 69, 300; 92/23–30; 74/411.5, 473.21, 473.24; 303/89
See application file for complete search history.

(56) References Cited

U.S. PATENT DOCUMENTS

| | | | |
|---|---|---|---|
| 6,386,338 B1 | 5/2002 | Powrozek | |
| 6,471,027 B1 * | 10/2002 | Gierer et al. | 192/219.5 |
| 6,823,976 B2 * | 11/2004 | Schmid | 192/219.5 |
| 7,410,038 B2 * | 8/2008 | Kleinert et al. | 188/300 |
| 7,650,978 B2 | 1/2010 | Ruhringer | |
| 7,866,763 B2 | 1/2011 | Inagaki | |
| 8,053,691 B2 | 11/2011 | Vernacchia et al. | |
| 2004/0011609 A1 * | 1/2004 | Schmid | 188/265 |
| 2008/0277236 A1 | 11/2008 | Ruhringer et al. | |
| 2012/0090951 A1 | 4/2012 | Scherer et al. | |

FOREIGN PATENT DOCUMENTS

| | | |
|---|---|---|
| JP | 3070317 B2 | 5/2000 |
| JP | 3190004 B2 | 5/2001 |
| JP | 2002-326523 A | 11/2002 |
| JP | 2008-128444 A | 6/2008 |
| KR | 10-1106498 B1 | 1/2012 |

* cited by examiner

*Primary Examiner* — Pamela Rodriguez
(74) *Attorney, Agent, or Firm* — Morgan, Lewis & Bockius LLP

(57) ABSTRACT

A locking apparatus for a parking brake includes a parking lever, a parking lever spring applying a restoring force to the parking lever, a cylinder of which an oil hole is formed thereto, a piston comprising a piston rod connected to the parking lever and a piston main body disposed within the cylinder, and the piston movable along length direction of the cylinder according to supplying or releasing of oil through the oil hole, a solenoid valve and a locking unit disposed within the cylinder for unlocking the piston when the solenoid valve is supplied electric power and for locking the piston when the solenoid valve is not supplied electric power.

12 Claims, 4 Drawing Sheets

LOCKING APPARATUS FOR PARKING BRAKE

CROSS-REFERENCE TO RELATED APPLICATION

This application claims priority to and the benefit of Korean Patent Application No. 10-2011-0072554 filed Jul. 21, 2011, the entire contents of which application is incorporated herein for all purposes by this reference.

BACKGROUND OF INVENTION

1. Field of Invention

The present invention relates to a locking apparatus for a parking brake. More particularly, the present invention relates to a locking apparatus for a parking brake which may maintain locking state even electric power is not applied.

2. Description of Related Art

Generally, a parking apparatus (parking brake), which maintains a vehicle in stop state by locking a sprag disposed to an output shaft with a parking gear at parking range "P", is provided to an automatic transmission.

FIG. 4 is a cross-sectional view of a conventional parking brake.

A conventional parking apparatus includes a detent lever 12 which is connected to a shift lever 10 and rotates according to the shift lever 10 selecting parking mode, a parking rod 14 which is connected to the detent lever 12 and moves rectilinearly by rotating of the detent lever 12 and of which a roller 28 is disposed to an end thereof, a sprag 18 which is rotatable around a hinge 30 and of which a locking protrusion 34 is formed to an end thereof, a return spring 32 which is disposed to the hinge 30 for supplying a restoring force to the sprag 18 and a parking gear 22 of which an engaging groove 20 selectively engaged with the locking protrusion 34 is formed thereto.

A rod spring 26 is disposed to the parking rod 14 for supplying a restoring force thereto.

In the conventional parking apparatus, when a driver manipulates the shift lever 10 to a parking mode, the detent lever 12 connected to the shift lever 10 rotates and then the parking rod 14 connected to the detent lever 12 moves rectilinearly. And then the roller 28 connected to an end of the parking rod 14 rotates the sprag 18.

And thus the parking gear 22 of the sprag 18 is engaged with the engaging groove 20 of the parking gear 22 for fixing the parking gear 22, so that parked state is maintained.

When the shift lever 10 is shifted from parking mode to other mode, the parking rod 14 cranks back by elastic force of the rod spring 26 and the sprag 18 also cranks back by elastic force of the return spring 32 and thus the locking protrusion 34 and the engaging groove 20 are separated so that parked state is finished.

Recently, a SBW (Shift By Wire) is usually used for transmitting driver's will to TCU so that mechanical parking is released by hydraulic pressure. So that just small power comparing to a conventional TGS (Transmission Gear Shift) lever (P/R/N/D) is required, and thus a driver is provided convenience.

Also, a solenoid valve and locking apparatus are used for preventing mechanical parking of a transmission when a vehicle is driven as a driving mode, for example D shift, and hydraulic pressure supplied to a parking piston is rapidly released.

However, in the conventional art, electric current must be supplied for maintaining locking state. And thus, if electric power in N shift is cut off, a brake is engaged.

With this scheme, a driver is provided with an inconvenience especially in a narrow parking area.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a locking apparatus for a parking brake having advantages of maintaining shift mode even in an engine-off state.

The present invention has been made in an effort to provide a locking apparatus for a parking brake having advantages of maintaining shift mode even in an engine-off state without supplying electric power and discharging a battery.

A locking apparatus for a parking brake according to various aspects of the present invention may include a parking lever, a parking lever spring applying a restoring force to the parking lever, a cylinder of which an oil hole is formed thereto, a piston comprising a piston rod connected to the parking lever and a piston main body disposed within the cylinder, and the piston movable along length direction of the cylinder according to supplying or releasing of oil through the oil hole, a solenoid valve and a locking unit disposed within the cylinder for locking the piston when the solenoid valve is supplied with electric power and for locking the piston when the solenoid valve is not supplied with electric power.

The locking unit may include a control rod which is selectively movable along length direction of the cylinder according to the electric power supplied to the solenoid valve and the control rod of which a slant portion is formed thereto, a control portion which is rotatable around a hinge and disposed within the cylinder and the control portion of which a protrusion is formed to an end of which, a plate formed to an end of the control rod, a seat movably disposed to the control rod and contacting the control portion and a seat spring disposed between the plate and the seat for supplying a restoring force to the seat, wherein a stepped portion is formed to the piston main body for the protrusion to be selectively locked thereto.

The slant portion may push the other end of the control portion, the control portion may rotate around the hinge and the locking of the protrusion and the stepped portion may be released when the solenoid valve is supplied with the electric power.

The control portion may rotate around the hinge by restoring force of the seat spring and the protrusion and the stepped portion may be locked when the electric power supplied to the solenoid valve is cut off.

The locking apparatus may further include a plunger which is connected to the control rod for moving the control rod along length direction of the piston when the solenoid valve is supplied with the electric power and a plunger spring supplying a restoring force to the plunger for the plunger to be moved when the electric power supplied to the solenoid valve is cut off.

The locking apparatus may further include a rod guider which guides the control rod and supports the plunger spring.

The locking apparatus may further include a finger stop which is disposed to the piston rod for limiting movement of the piston rod.

The locking apparatus may further include a seat guider which is disposed within the cylinder for guiding the seat.

A locking apparatus for a parking brake according to various aspects of the present invention may include a parking lever, a parking lever spring applying a restoring force to the parking lever, a cylinder of which an oil hole is formed thereto, a piston comprising a piston rod connected to the parking lever and a piston main body disposed within the cylinder and a stepped portion is formed thereto, and the piston movable along length direction of the cylinder according to supplying or releasing of oil through the oil hole, a solenoid valve, a plunger movable along length direction of the piston when the solenoid valve is supplied with the electric power, a plunger spring supplying a restoring force to the plunger for the plunger to be moved when the electric power supplied to the solenoid valve is cut off, a rod guider supporting the plunger spring and a locking unit disposed within the cylinder for locking the piston when the solenoid valve is supplied with electric power, wherein the locking unit may include a control rod which is selectively movable with the plunger along length direction of the cylinder, being guided by the rod guider, according to the electric power supplied to the solenoid valve and the control rod of which a slant portion is formed thereto, a control portion which is rotatable around a hinge and disposed within the cylinder and the control portion of which a protrusion is formed to an end of which, a plate formed to an end of the control rod, a seat movably disposed to the control rod and contacting the control portion and a seat spring disposed between the plate and the seat for supplying a restoring force to the seat.

The slant portion may push the other end of the control portion, the control portion may rotate around the hinge and the locking of the protrusion and the stepped portion may be released when the solenoid valve is supplied with the electric power.

The control portion may rotate around the hinge by restoring force of the seat spring and the protrusion and the stepped portion may be locked when the electric power supplied to the solenoid valve is cut off.

The locking apparatus may further include a finger stop which is disposed to the piston rod for limiting movement of the piston rod.

The locking apparatus may further include a seat guider which is disposed within the cylinder for guiding the seat.

According to various aspects of the present invention, shift mode may be maintained even in an engine-off state without supplying electric power and discharging a battery.

And even an engine operation is stopped in N shift, the N shift mode may be maintained and thus a vehicle may be easily parked in a narrow parking area.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
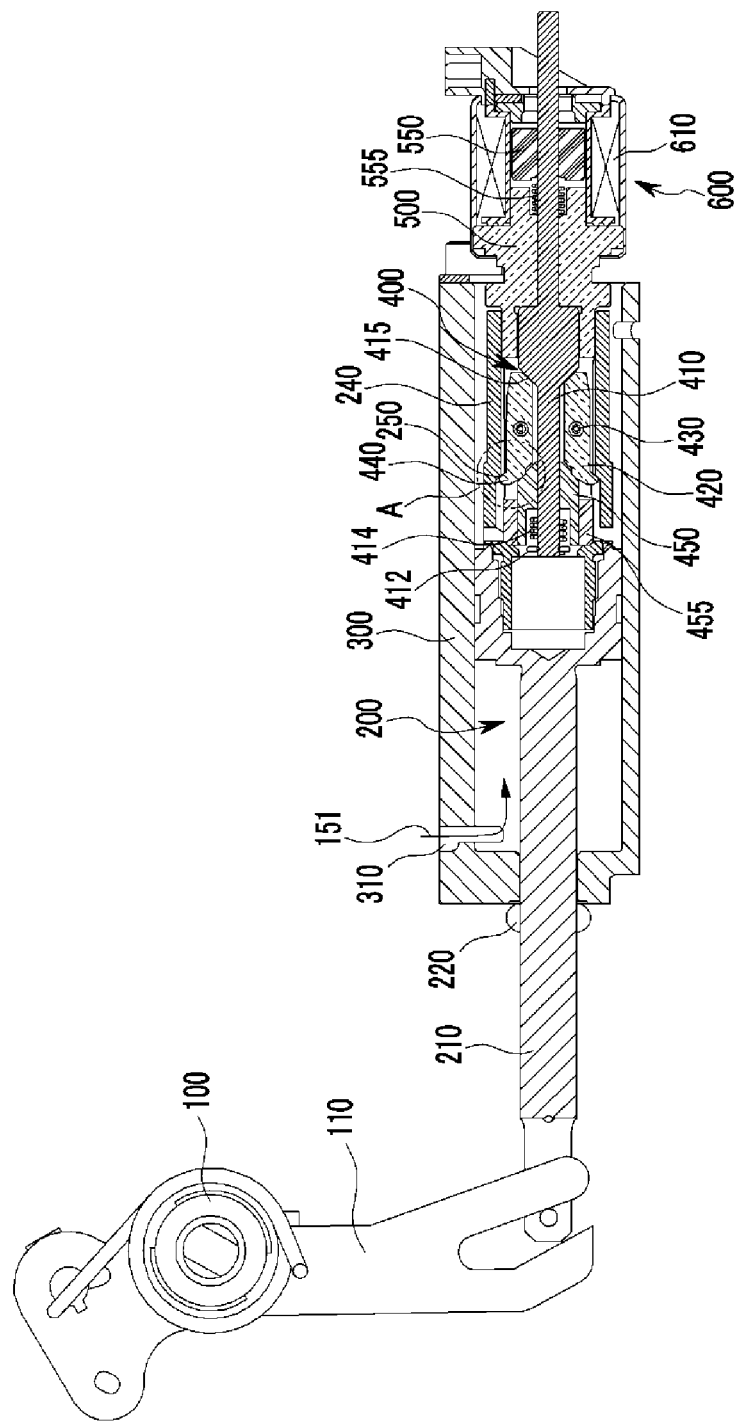
FIG. 1 is a cross-sectional view of an exemplary locking apparatus for a parking brake according to the present invention operating in R/N/D shift mode.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

For easy comprehension, constituent elements which are described in description of the related art will be described using the same reference numeral.

Figure 2:
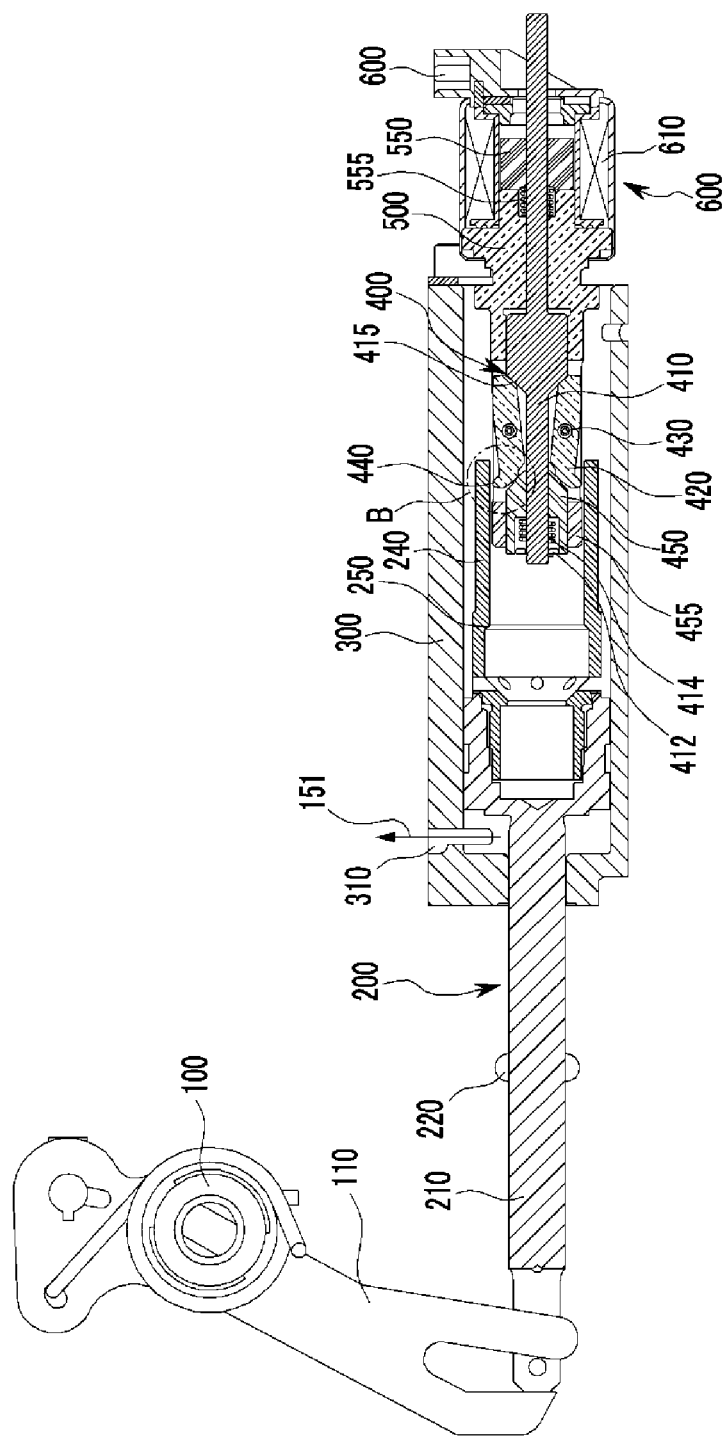
FIG. 2 is a cross-sectional view of an exemplary locking apparatus for a parking brake according to the present invention operating in P shift mode.
Figure 3:
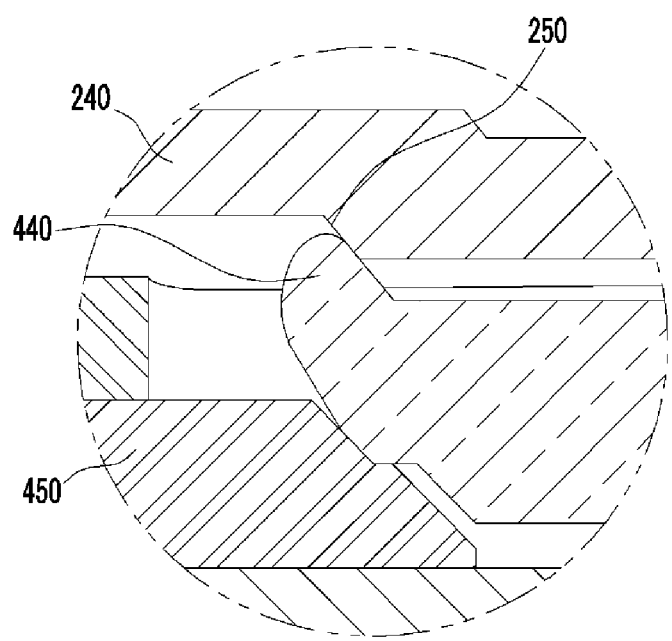
FIG. 3 is an enlarged view of A of FIG. 1.

FIG. 1 is a cross-sectional view of a locking apparatus for a parking brake according to various embodiments of the present invention operating in R/N/D shift mode and FIG. 2 is a cross-sectional view of a locking apparatus for a parking brake according to various embodiments of the present invention operating in P shift mode.

Referring to FIG. 1 and FIG. 2, a locking apparatus for a parking brake according to various embodiments of the present invention includes a parking lever 110, a parking lever spring 100 applying a restoring force to the parking lever 110, a cylinder 300 of which an oil hole 310 is formed thereto, a piston 200 including a piston rod 210 connected to the parking lever 110 and a piston main body 240 disposed within the cylinder 300, and the piston 200 movable along length direction of the cylinder 300 according to supplying or releasing of oil 151 through the oil hole 310, a solenoid valve 600 and a locking unit 400 disposed within the cylinder 300 for locking the piston 200 when the solenoid valve 600 is supplied with electric power and for locking the piston 200 when the solenoid valve 600 is not supplied with electric power.

The locking unit 400 includes a control rod 410 which is selectively movable along length direction of the cylinder 300 according to the electric power supplied to the solenoid valve 600 and the control rod 410 of which a slant portion 415 is formed thereto, a control portion 420 which is rotatable around a hinge 430 and disposed within the cylinder 300 wherein the control portion 420 includes a protrusion 440 formed to an end thereof, a plate 412 formed to an end of the control rod 410, a seat 450 movably disposed to the control rod 410 and contacting the control portion 420 and a seat spring 414 disposed between the plate 412 and the seat 450 for supplying a restoring force to the seat 450.

A stepped portion 250 is formed to the piston main body 240 for the protrusion 440 to be selectively locked thereto.

The locking apparatus further include a plunger 550 which is connected to the control rod 410 for moving the control rod 410 along length direction of the piston 200 when the solenoid valve 600 is supplied with the electric power and a plunger spring 555 supplying a restoring force to the plunger 550 for the plunger 550 to be moved when the electric power supplied to the solenoid valve 600 is cut off.

The locking apparatus further includes a rod guider 500 which guides the control rod 410 and supports the plunger spring 555.

When the solenoid valve 600 is supplied with electric power, magnetic force generated by a coil 610 pushes the plunger 550 and thus the control rod 410 moves to leftward of FIG. 1.

On the contrary, when supplied with electric power to the solenoid valve 600 is cut off, the control rod 410 moves to rightward of FIG. 1 by the restoring force of the plunger spring 555.

The locking apparatus further includes a finger stop 220 which is disposed to the piston rod 210 for limiting movement of the piston rod 210.

The locking apparatus further includes a seat guider 455 which is disposed within the cylinder 300 for guiding the seat 450.

When the solenoid valve 600 is supplied with power, the slant portion 415 pushes the other end of the control portion 420, the control portion 420 rotates around the hinge 430, and locking of the protrusion 440 and the stepped portion 250 is released.

When the power supplied to the solenoid valve 600 is cut off, the control portion 420 rotates around the hinge 430 by the restoring force of the seat spring 414 and thus the protrusion 440 and the stepped portion 250 are locked.

In various embodiments of the present invention, releasing of the locking denotes a state that the piston 200 is in movable state without locking with the locking unit 400.

Also, the locking state means a state that the piston 200 is in unmovable state by locking with the locking unit 400.

Hereinafter, parking mode means a state that the oil 151 within the cylinder 300 is released as shown in FIG. 2 and others mode (except the parking mode) means a state that the oil 151 is supplied to within the cylinder 300 and the piston 200 moves to rightward as shown in FIG. 1.

Figure 4:
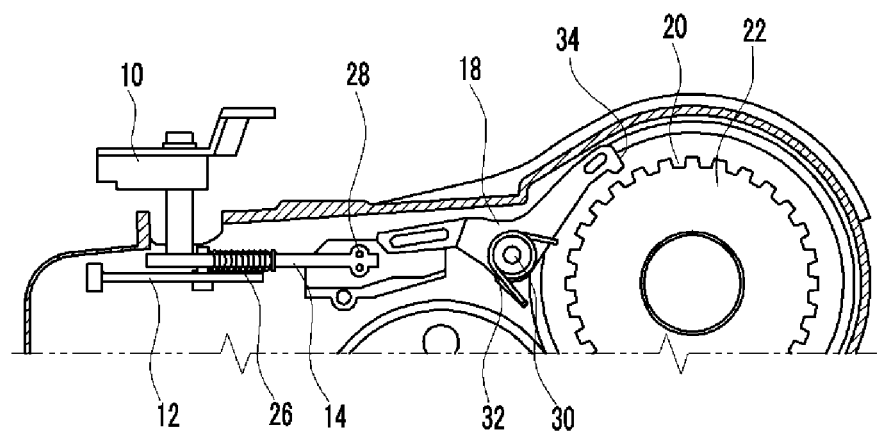
FIG. 4 is a cross-sectional view of a conventional parking brake.

According to rotation of the parking lever 110, a sprag 18 and a parking gear 22 shown in FIG. 4 are engaged in the parking mode and the engagement are released in the others mode.

Construction of the parking lever and the sprag 18 and so on are obvious to a person skilled in the art and thus detailed description will be omitted.

Hereinafter, operation of the locking apparatus for a parking brake according to various embodiments of the present invention will be described.

The others mode, for example, in R/N/D shift mode, will be described referring to FIG. 1.

In the other modes, the oil 151 is supplied to the cylinder 300 through the oil supply hole 310 and the piston 200 relatively moves into the cylinder 300 and the engagement of the sprag 18 and parking gear 22 is released (referring to FIG. 4).

The solenoid valve 600 is not supplied with power and the seat 450 pushes the end of the control portion 420 by the elastic force of the seat spring 414 and thus the protrusion 440 is locked to the stepped portion 250.

That is, it is locked by the locking unit 400.

In this condition, for example, vehicle is in driving in D shift mode, even if the oil 151 is released, the parking brake (the parking system) does not operated due to connection of the protrusion 440 and the stepped portion 250.

Also, for example, even if ignition of a vehicle is off in N shift mode, the parking brake is not operated by the connection of the protrusion 440 and the stepped portion 250.

The solenoid valve 600 according to various embodiments of the present invention is NH (normal high) type and thus even though current supply is cut off, a state as shown in FIG. 1 may be maintained. And thus, the locking state may be maintained and thus the neutral mode may be maintained even in ignition off of a vehicle.

That is, in the other modes, particularly in the N shift mode, while the hydraulic pressure is released and the piston 200 may be moved toward the spring 100 by the restoring force of the spring 100, however the stepped portion 250 is locked to the protrusion 440 and thus the piston 200 may not be moved.

Is this case, the ignition is off, and thus the power supplied to the solenoid valve 600 is cut off. And to conclude, even if an engine is off in the N shift mode, the N shift mode may be maintained.

The locking apparatus for a parking brake according to various embodiments of the present invention may maintain current shift mode in disoperation condition without supplying power to a solenoid valve and thus discharging of a battery may be prevented.

Hereinafter, referring to FIG. 2, the operation of the locking apparatus for a parking brake according various embodiments of the present invention in the parking (P) mode will be described.

In the parking mode according to various embodiments of the present invention, the solenoid valve 600 is supplied with current (electric power) so that the locking state is released.

When the solenoid valve 600 is supplied with the current, as shown in FIG. 2, the plunger 550 and the control rod 410 move to the leftward of the drawing. The slant portion 415 pushes the other end of the control portion 420 and the control portion 420 rotates around the hinge 430 so that the locking (connection) of the protrusion 440 and the stepped portion 250 is released.

That is, as shown "B" of FIG. 2, the locking of the locking unit 400 is released and then the parking mode is implemented.

Simultaneously, the oil 151 is released through the oil hole 310 and the piston 200 move to the leftward of the drawing by the restoring force of the parking lever spring 100.

And then, the sprag 18 and the parking gear 22 (referring to FIG. 4) are engaged so that the parking mode is implemented.

And then, if the vehicle mode is changed from the parking mode to the other modes, for example, to R/N/D shift modes, as shown in FIG. 1, the oil 151 is supplied through the oil hole 310, the piston 200 moves to the rightward of the drawing, the current supplied to the solenoid valve 600 is cut off and the plunger 550 and the control rod 410 move to the rightward of the drawing by the restoring force of the plunger spring 555.

And the seat 450 pushes the end of the control portion 420 by the elastic force of the seat spring 414, and the protrusion 440 is locked to the stepped portion 250 so that the locking by the locking unit 400 is realized.

The locking apparatus for a parking brake according to various embodiments of the present invention may maintain current shift mode in disoperation condition without supplying power to the solenoid valve 600 and thus discharging of a battery may be prevented, especially in the N shift mode.

Also, even if the hydraulic pressure supplied to the cylinder is reduced in driving condition, the locking condition may be maintained, so that the parking brake is not operated and thus accident may be prevented and energy efficiency may be enhanced.

For convenience in explanation and accurate definition in the appended claims, the terms left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present inven-

What is claimed is:

1. A locking apparatus for a parking brake comprising:
a parking lever;
a parking lever spring applying a restoring force to the parking lever;
a cylinder including an oil hole formed therein;
a piston comprising a piston rod connected to the parking lever and a piston main body disposed within the cylinder, and the piston movable along a length direction of the cylinder according to supplying or releasing of oil through the oil hole;
a solenoid valve; and
a locking unit disposed within the cylinder for unlocking the piston when the solenoid valve is supplied with electric power and for locking the piston when the solenoid valve is not supplied with electric power;
wherein the locking unit comprises:
a control rod selectively movable along the length direction of the cylinder according to the electric power supplied to the solenoid valve and the control rod including a slant portion is formed therein;
a control portion rotatable around a hinge and disposed within the cylinder and the control portion including a protrusion is formed on an end thereof;
a plate formed to an end of the control rod;
a seat movably disposed on the control rod and contacting the control portion; and
a seat spring disposed between the plate and the seat for supplying a restoring force to the seat,
wherein a stepped portion is formed to the piston main body for the protrusion to be selectively locked thereto.

2. The locking apparatus of claim 1, wherein the slant portion pushes the other end of the control portion, the control portion rotates around the hinge and the locking of the protrusion and the stepped portion is released when the solenoid valve is supplied with the electric power.

3. The locking apparatus of claim 1, wherein the control portion rotates around the hinge by restoring force of the seat spring and the protrusion and the stepped portion are locked when the electric power supplied to the solenoid valve is cut off.

4. The locking apparatus of claim 1, wherein the locking apparatus further comprises:
a plunger connected to the control rod for moving the control rod along the length direction of the piston when the solenoid valve is supplied with the electric power; and
a plunger spring supplying a restoring force to the plunger for the plunger to be moved when the electric power supplied to the solenoid valve is cut off.

5. The locking apparatus of claim 4, wherein the locking apparatus further comprises a rod guider that guides the control rod and supports the plunger spring.

6. The locking apparatus of claim 1, wherein the locking apparatus further comprises a finger stop disposed at the piston rod for limiting movement of the piston rod.

7. The locking apparatus of claim 1, wherein the locking apparatus further comprises a seat guider disposed within the cylinder for guiding the seat.

8. A locking apparatus for a parking brake comprising:
a parking lever;
a parking lever spring applying a restoring force to the parking lever;
a cylinder including an oil hole is formed therein;
a piston comprising a piston rod connected to the parking lever and a piston main body disposed within the cylinder and a stepped portion is formed thereto, and the piston movable along a length direction of the cylinder according to supplying or releasing of oil through the oil hole;
a solenoid valve;
a plunger movable along the length direction of the piston when the solenoid valve is supplied with the electric power;
a plunger spring supplying a restoring force to the plunger for the plunger to be moved when the electric power supplied to the solenoid valve is cut off;
a rod guider supporting the plunger spring; and
a locking unit disposed within the cylinder for unlocking the piston when the solenoid valve is supplied with electric power,
wherein the locking unit comprises
a control rod selectively movable with the plunger along the length direction of the cylinder, being guided by the rod guider, according to the electric power supplied to the solenoid valve and the control rod including a slant portion is formed thereon;
a control portion rotatable around a hinge and disposed within the cylinder and the control portion including a protrusion formed to an end thereof;
a plate formed to an end of the control rod;
a seat movably disposed to the control rod and contacting the control portion; and
a seat spring disposed between the plate and the seat for supplying a restoring force to the seat.

9. The locking apparatus of claim 8, wherein the slant portion pushes the other end of the control portion, the control portion rotates around the hinge and the locking of the protrusion and the stepped portion is released when the solenoid valve is supplied with the electric power.

10. The locking apparatus of claim 8, wherein the control portion rotates around the hinge by restoring force of the seat spring and the protrusion and the stepped portion are locked when the electric power supplied to the solenoid valve is cut off.

11. The locking apparatus of claim 8, wherein the locking apparatus further comprises a finger stop disposed at the piston rod for limiting movement of the piston rod.

12. The locking apparatus of claim 8, wherein the locking apparatus further comprises a seat guider disposed within the cylinder for guiding the seat.

* * * * *